Patented July 31, 1928.

1,678,767

UNITED STATES PATENT OFFICE.

LEO P. CURTIN, OF FREEHOLD, NEW JERSEY.

PROCESS OF MAKING ALKALI-METAL HYDROXIDES.

No Drawing. Application filed April 24, 1926, Serial No. 104,481. Renewed January 17, 1928.

This invention is a novel process of cyclical character, whereby hydroxides of the alkali metals may be economically prepared in a state of commercial purity. The process is especially advantageous in its application to the preparation of caustic soda, with hydrochloric acid as a by-product; and will be described in connection with this particular embodiment, although not limited thereto.

I have found that if litharge, or other form of lead monoxid, be suspended in water, or in an aqueous solution of caustic alkali, and strongly agitated while a solution of sodium sulfid is introduced at a carefully controlled rate, a substantially quantitative reaction occurs which may be represented by the equation:

$$PbO + Na_2S + H_2O = PbS + 2NaOH$$

For the successful carrying out of this reaction it is essential that the lead oxid should be finely divided; that its suspension should be thoroughly agitated by suitable mechanical means; and that the introduction of the sodium sulfid should be so controlled and regulated with reference to the velocity of the reaction as to avoid any substantial accumulation of sulfid ion in solution. Failing these conditions the particles of litharge become externally coated with sulfid, resulting in the precipitation of a mixture of oxid and sulfid and a corresponding falling off in the efficiency of the process. I believe myself the first to discover that by a proper adjustment of the essential conditions specified above, the reaction between lead oxid and an alkali sulfid can be effected in a substantially quantitative manner.

The reaction above described is, in the preferred embodiment of the invention, made the basis of a cyclical process in which the raw materials purchased are sodium chlorid (common salt) and coke, or other form of carbon; and the final products are sodium hydroxide and hydrochloric acid. A preferred embodiment of this process may best be represented by the following equations:

(1) $4NaCl + 2H_2SO_4 = 2Na_2SO_4 + 4HCl$
(2) $Na_2SO_4 + 2PbS = Na_2S + 2SO_2 + 2Pb$
(2$^a$) $Na_2SO_4 + 2C = Na_2S + 2CO_2$
(3) $2Pb + O_2 = 2PbO$
(4) $2SO_2 + O_2 + 2H_2O = 2H_2SO_4$
(5) $2PbO + 2Na_2S + 2H_2O = 2PbS + 4NaOH$

While these equations are self-explanatory, the reactions indicated may be briefly formulated as follows:

(1) Sodium chlorid is converted by the equivalent proportion of sulfuric acid into sodium sulfate and hydrochloric acid, this last being one of the products of the process.

(2) A portion of the sodium sulfate resulting from (1) is reacted with lead sulfid to yield sodium sulfid, sulfur dioxid and metallic lead.

(2$^a$) Another portion of the sodium sulfate is directly reduced by carbon (coke) to sodium sulfid.

(3) The metallic lead resulting from (2) is oxidized to litharge.

(4) The sulfur dioxid resulting from (2) is oxidized to sulfuric acid, for use in (1).

(5) A reaction is brought about under the conditions already described between the lead oxid (litharge) and the sodium sulfid, yielding lead sulfid and caustic soda, this latter available after appropriate concentration for sale or use.

It will be noted that, except for normal manufacturing waste, all materials other than sodium chlorid and coke are regenerated for use in the cycle.

It will be understood that my invention is not restricted to the employment of all of the reactions indicated; and in particular the regenerative reactions (2), (3) and (4) may be altered in any way desired without impairing the process. In the case potassium hydroxide is to be prepared, reaction (1) is unnecessary, since potassium sulfate is directly available as a raw material, yielding sulfuric acid as one of the products of the process.

Reaction (5) takes place rapidly and substantially quantitatively, yielding lead sulfid in a physical condition excellently adapted for separation by filtration or otherwise from the alkali solution, and the latter in a condition of high purity. The concentration of the caustic alkali solution as initially prepared will of course depend upon the amount of water present in reaction (5). This may readily be limited to yield solutions containing upward of 150 grams per liter of sodium hydroxide.

I claim:

1. Process of making alkali-metal hydroxides comprising agitating an aqueous suspension of lead monoxid while adding an alkali-metal sulfid, and regulating the rate of supply of sulfid to avoid substantial accumulation of sulfid ions in solution.

2. In a cyclical process of making alkali-metal hydroxides, the steps comprising agitating an aqueous suspension of lead monoxid while adding an alkali-metal sulfid, thereby precipitating lead sulfid and forming a caustic alkali solution, separating the lead sulfid from the solution and converting it to lead monoxid, and returning the monoxid to the operating cycle.

In testimony whereof, I affix my signature.

LEO P. CURTIN.